Jan. 24, 1961   R. W. JENSEN   2,969,206
BOUNDARY LAYER CONTROL SYSTEM FOR AIRCRAFT
Filed Dec. 4, 1956

RAYMOND W. JENSEN,
INVENTOR.

BY John H. J. Wallace

United States Patent Office 2,969,206
Patented Jan. 24, 1961

2,969,206
BOUNDARY LAYER CONTROL SYSTEM FOR AIRCRAFT

Raymond W. Jensen, Phoenix, Ariz., assignor to The Garrett Corporation, Los Angeles, Calif., a corporation of California Filed Dec. 4, 1956, Ser. No. 626,141

4 Claims. (Cl. 244—42)

This invention relates to a boundary layer control system for aircraft, and more particularly to a boundary layer control system which is capable of increasing lift on airfoil surfaces of an aircraft to assist lateral control thereof.

Boundary layer control systems are known which employ compressed air bled from the compressor of the aircraft engine and the compressed air is released above the wing flaps or ailerons, thereby increasing lift and permitting the aircraft to assume a high angle of attack when landing or taking off. In this manner the distances required for takeoff and landing operations of an aircraft are greatly reduced. In addition, corresponding takeoff and landing speeds are also reduced.

It has been a problem to maintain lateral stability of an aircraft when landing or taking off at high angles of attack while employing boundary layer control air to increase lift on the airfoil surfaces of the aircraft.

Accordingly, it is an object of the present invention to provide a boundary layer control system for aircraft, wherein lateral control airfoil elements of an aircraft actuate boundary layer control valves which automatically vary flow of boundary layer control air in accordance with varying attitudes of the airfoil elements.

Another object of the invention is to provide a boundary layer control system wherein ailerons or flaps actuate boundary layer control valves by means of cams or other suitable mechanism, thereby tending to modulate the flow of boundary layer control air over the airfoil elements in proportion to the degree of deflection thereof relative to the aircraft.

Another object of the invention is to provide a boundary layer control system having a dual pressure regulator which permits a predetermined selection of a desired pressure to be imposed upon pneumatic actuators of valves located to control the flow of boundary layer control air over the airfoil elements of an aircraft.

Another object of the invention is to provide a boundary layer control system for aircraft which permits a pilot to easily control level flight of the aircraft when landing or taking off at very high angles of attack.

Further objects and advantages of the present invention may be apparent from the following specification, appended claims and accompanying drawings in which:

Figure 1:
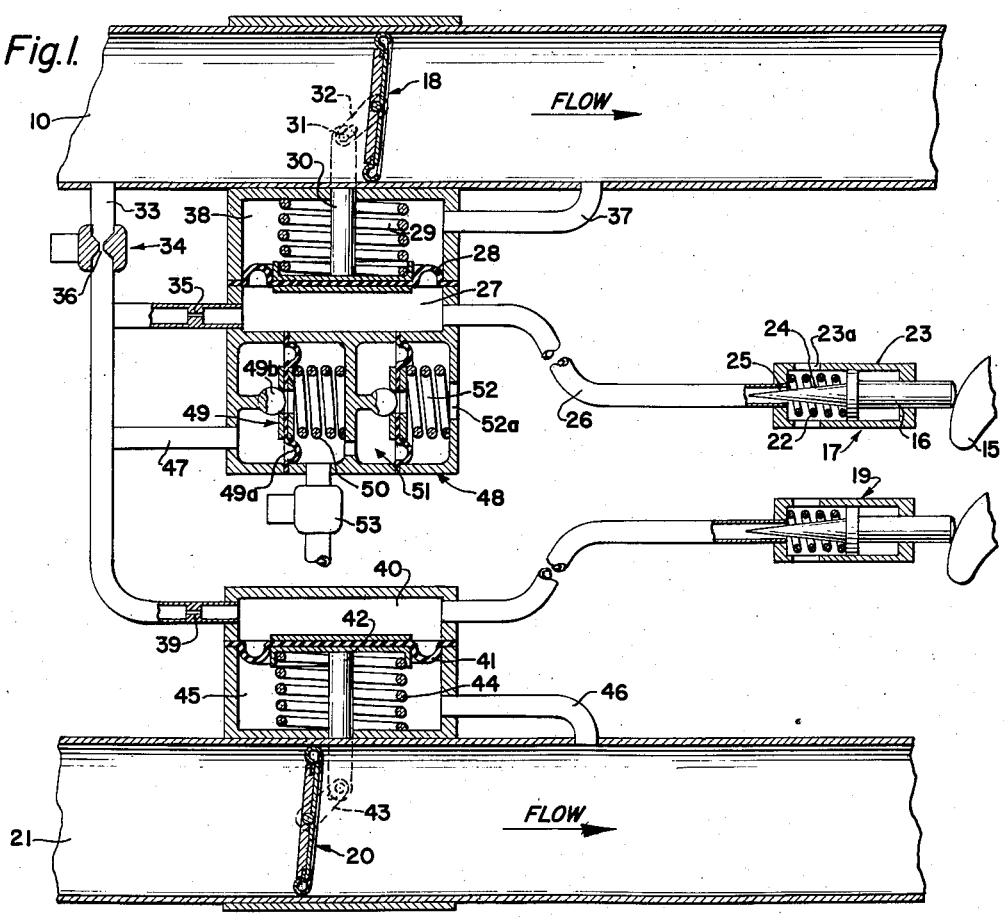
Figure 1 is a fragmentary diagrammatic view of a boundary layer control system for aircraft.
Figure 2:
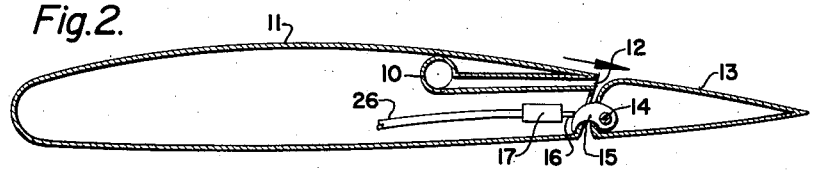
Figure 2 is a cross-sectional view of an aircraft wing showing the boundary layer control air duct and a pilot valve operated by an aileron of the aircraft wing.
Figure 3:
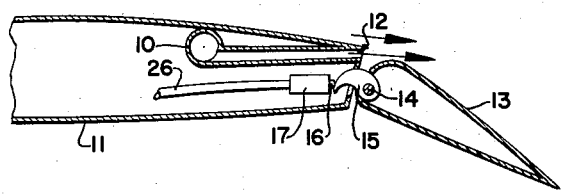
Figure 3 is a fragmentary sectional view similar to Figure 2 but showing the aileron in a different operating position.

As shown in Figures 1 and 2 of the drawing, a conduit 10 extends to the right-hand wing 11 of an aircraft. As shown in Figure 2 of the drawing, the right-hand wing 11 is provided with a slot 12, which is arranged to direct high pressure air over the upper surface of an aileron 13, disposed for pivotal movement, relative to the wing, on a pin 14. As shown in Figure 3, a cam 15 is fixed to the aileron 13 and when the aileron moves, the cam actuates a plunger 16 of a pilot valve 17. This pilot valve is arranged to control modulating action of a main boundary layer control valve 18 located to control flow through the conduit 10, which will be hereinafter described in detail. A pilot valve 19, similar to the pilot valve 17, is arranged to control operation of a second main boundary layer control valve 20. This valve 20 is disposed to control flow through the conduit 21, which is similar to the conduit 10. The conduit 21 communicates with a slot in the left-hand wing of the aircraft similar to slot 12 in the right wing. Inasmuch as the pilot valves 17 and 19 are identical, parts of the latter are identified by the same reference characters employed to designate corresponding parts of the former.

The plunger 16 of the pilot valve 17 is loaded in normally open position by means of a spring 22, which is supported in a casing 23, wherein the plunger 16 is reciprocally mounted. The plunger 16 is provided with a tapered end portion 24, which is adapted to vary the area of a passage 25 in the casing 23. The passage 25 communicates with ambient pressure through openings 23a in the casing 23. The passage 25 also communicates, through a tube 26, with a chamber 27 at one side of a diaphragm 28 engaged by a spring 29 disposed to oppose movement of the diaphragm in response to pressure in the chamber 27. A stem 30 is fixed to the diaphragm 28 and is pivotally connected by means of a pin 31 to a bell crank 32, which is fixed to the butterfly valve 18. Communicating with the conduit 10 upstream of the valve 18 is a pressure supply tube 33, which also communicates with a solenoid valve 34 having a restricted orifice 36. A second restricted orifice 35 intercommunicates with the orifice 36 and the chamber 27. Downstream of the valve 18 is a tube 37 which intercommunicates with the conduit 10 and a chamber 38 at the side of the diaphragm 28 opposite the chamber 27.

The solenoid valve 34 is a normally closed valve and when open permits flow through the orifice 36, which supplies flow to the restricted orifice 35 and a similar restricted orifice 39, which communicates with a chamber 40. Adjacent to the chamber 40 is a diaphragm 41 connected by a stem 42 to a bell crank 43, which is fixed to the butterfly valve 20. A spring 44 engages the diaphragm 41 and tends to oppose movement of the diaphragm 41 under pressure in the chamber 40. A chamber 45 is arranged to contain pressure which acts on the diaphragm 41 in opposition to that in the chamber 40. A tube 46 intercommunicates with the chamber 45 and the conduit 21 downstream of the valve 20.

A tube 47 communicates with the solenoid valve 34, orifices 35 and 39, and also with a dual pressure regulator 48. This regulator is arranged for use in selecting either of two different pressures which may exist in the chambers 27 and 40. This pressure regulator is provided with a blowoff valve 49 comprising a diaphragm 49a and a stationary ball valve element 49b. A spring 50 tends to maintain the valve 49 in normally closed position. This spring 50 resists the opening of the blowoff valve 49 until a given pressure exists in the tube 47 and acts on the diaphragm 49a, whereupon the blowoff valve 49 permits escape of air from the tube 47. A second blowoff valve 51 is subjected to the outlet pressure of the blowoff valve 49. The blowoff valve 51 is similar in construction to that of the valve 49 and is provided with a spring 52, having preloaded stress greater than that of the spring 50, whereby the blowoff pressure of the valve 51 is greater than that of the valve 49. The blowoff valve 51 is also provided with a vent opening 52a so that it may discharge to the surrounding atmosphere. Thus, the blowoff valves 49 and 51 in series may be utilized to maintain a high pressure in the tube 47 and chambers 27 and 40. A vent valve 53 is disposed ot communicate with pressure intermediate the blowoff valves 49 and 51. This vent valve 53 is a normally open solenoid valve which permits pressure to escape at the outlet of the blowoff valve 49 when the solenoid valve is de-energized. Thus, the blowoff valve 49 may be operated by itself to maintain a low pressure in the chambers 27 and 40, and when the valve 53 is energized and moves to the closed position, it will cause the blowoff valves 49 and 51 to operate in series, whereupon said high pressure is maintained in the chambers 27 and 40.

When the present boundary layer control system is operated in connection with an aircraft, the pilot valves 17 and 19 are actuated in proportion to the movement of the aircraft wing ailerons by means of cams 15, whereby the main boundary layer control valves 18 and 20 are caused to modulate flow of boundary layer control air to the slots 12 above the ailerons.

Referring to Figure 3 of the drawings, for example, it will be seen that downward movement of the aileron 13 causes the cam 15 to force the tapered portion 24 of the plunger 16 inwardly into the passage 25, which restricts the same. Pressure in the chamber 27 is thus increased, due to the fact that it is supplied with a constant volume of air through the restricted orifice 35 and by varying the leak off through the passage 25, the pressure downstream of the orifice 35 will vary. The plunger 16, when actuated by the aileron 13, is thus capable of modulating pressure in the chamber 27. Such modulation of the pressure in the chamber 27 causes corresponding deflection of the spring 29 and a relative opening movement of the valve 18. This valve 18, however, is a pressure regulating valve and when pressure downstream of the valve 18 exceeds a predetermined amount, pressure sensed in the chamber 38 acts against the diaphragm 28 to oppose pressure in the chamber 27. The valve 18 thus operates as a flow control valve, and therefore tends to increase boundary layer flow in direct proportion to downward deflection of the aileron 13. Conversely, upward deflection of the aileron 13 causes a proportional decrease of flow of boundary layer control air through the slot 12.

Operation of the pilot valve 19, in co-operative relation with the main boundary layer control valve 20, is similar to that of the pilot valve 17 and the main boundary layer control valve 18.

It will be understood that when a wing of an aircraft tends to dip downwardly, the present boundary layer control system automatically assists action of the respective aileron to increase lift on the particular wing, in order to maintain level flight of the aircraft. As the pilot actuates the aircraft ailerons to maintain level flight of the aircraft, the system will allow the aileron that is lowered to automatically increase the boundary layer airflow over the lowered aileron thus increasing the lift on the particular wing. The opposite result will take place on the aileron that is raised thus decreasing the lift on the opposite wing. The combination of increased lift on one wing and decreased lift on the opposite wing will greatly assist the pilot in maintaining the aircraft in a level flight position. Thus the present boundary layer control system readily assists a pilot in maintaining level flight of an airplane when taking off or landing at high angles of attack.

The dual pressure regulator 48 is controlled by the solenoid valve 53, which may be electrically connected to a switch in the pilot's compartment. When the solenoid valve 53 is energized and in closed position, both the blowoff valves 49 and 51 operate in series, maintaining a high pressure in the chambers 27 and 40, which tends to maintain a fully open position of the valves 18 and 20. Thus, the maximum flow of boundary layer control air through the slots 12 may be permitted, whereby an extremely high angle of attack of the aircraft may exist due to the increased lift which is created upon the airfoil surfaces. At this high angle of attack, the aircraft may be landed at low speed and on a very short runway.

Maximum boundary layer control air flow constitutes a very substantial portion of the aircraft engine compressor output, and therefore reduces thrust of the aircraft engine. In the event that an aircraft is landing at a high angle of attack, with maximum boundary layer control air flow, and at the same time is waved off the field, the remaining thrust of the aircraft engine may not be sufficient to take off with reasonable facility. The aircraft pilot may then de-energize the solenoid valve 53, whereby the blowoff valve 51 is bypassed, thus permitting the blowoff valve 49 to maintain a substantially lower pressure in the chambers 27 and 40. This causes a partial closing action of the valves 18 and 20, which results in a reduction of boundary layer control air flow through the conduits 10 and 21. Under these conditions the aircraft may maintain a reasonably high angle of attack; and since the flow of boundary layer control air is nominal, the aircraft engine has sufficient thrust to take off with facility. It will therefore be apparent that the dual pressure regulator 48 provides a great operational advantage in connection with the boundary layer control system and that the boundary layer control valves 18 and 20, modulated by action of the aircraft ailerons, help maintain level flight of the aircraft when operating at high angles of attack.

It is desired to emphasize the fact that various modifications of the present invention may be resorted to in a manner limited only by the broad spirit and scope of the following claims.

I claim:

1. In a boundary layer control for aircraft the combination of: a movable airfoil element; an air flow system having a duct communicating with and extending in close proximity to said airfoil element for supplying boundary layer control air thereto; a main valve having a pneumatic actuator, said main valve being disposed in said system to control flow through said duct; pilot valve means in said system and communicating with said pneumatic actuator, said pilot valve being responsive to the movement of said airfoil element to control the operation of said actuator and main valve thereby varying the flow of air through said duct; regulator means in said system and communicating with the actuator for said main valve, said regulator means having a pair of pneumatic pressure regulators in series; and a bypass means for one of the pressure regulators, operation of said bypass means serving to select either of two different pressures to be supplied to said actuator.

2. In a boundary layer control system for aircraft, the combination of: a movable airfoil element; an air supply duct having an outlet disposed adjacent said airfoil element to supply boundary layer control air thereto; a main valve disposed for movement in said duct to vary the volume of air supplied to said airfoil element; actuating means for said main valve, said actuating means having a fluid pressure responsive member operatively connected with said main valve; means for conducting fluid from the inlet side of said main valve to one side of said pressure responsive member and from the outlet side of said main valve to the other side of such member; and a pilot valve communicating with said actuating means, said pilot valve being disposed to be actuated by said airfoil element to vary the fluid pressure applied to one side of the pressure responsive member of said actuating means.

3. In a boundary layer control system for aircraft, the combination of: a movable airfoil element; a duct having an outlet disposed adjacent said airfoil element to supply boundary layer control air thereto; a main valve disposed for movement in said duct to vary the volume of air supplied to said airfoil element; actuating means for said main valve, said actuating means having a fluid pressure responsive member operatively connected with said main valve; means for conducting fluid under pressure to said actuating means; pressure regulating means communicating with said fluid conducting means, said regulating means being adjustable to selectively vary the maximum pressures of fluid supplied to said actuating means; and a pilot valve communicating with said actuating means, said pilot valve being disposed to be actuated by said airfoil element to vary the fluid pressure applied to the pressure responsive member of said actuator in proportion to the extent of movement of said airfoil element.

4. In a boundary layer control system for aircraft, the combination of: a movable airfoil element; an air supply duct having an outlet disposed adjacent said airfoil element to supply boundary layer control air thereto; a main valve disposed for movement in said duct to vary the volume of air supplied to said airfoil element; actuating means for said main valve, said actuating means having a fluid pressure responsive member operatively connected with said main valve; means for conducting fluid from the inlet side of said main valve to one side of said pressure responsive member and from the outlet side of said main valve to the other side of such member; resilient means tending to move said pressure responsive member in a main valve closing direction; and a pilot valve communicating with said actuating means, said pilot valve being disposed to be actuated by said airfoil element to vary the fluid pressure applied to said pressure responsive member to move the same in a main valve opening direction.

References Cited in the file of this patent

UNITED STATES PATENTS

| | | |
|---|---|---|
| 1,512,597 | Harmon | Oct. 21, 1924 |
| 1,554,683 | Mount et al. | Sept. 22, 1925 |
| 2,162,940 | De Florez | June 20, 1939 |
| 2,478,793 | Trey | Aug. 9, 1949 |
| 2,700,516 | Nazir | Jan. 25, 1955 |